O. VON SCHUTZ.
BALL BEARING.
APPLICATION FILED AUG. 19, 1908.
968,271.
Patented Aug. 23, 1910.
Fig. 1.
Fig. 2.
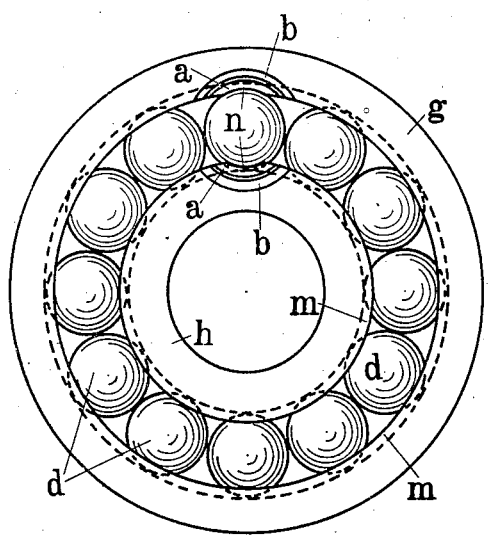
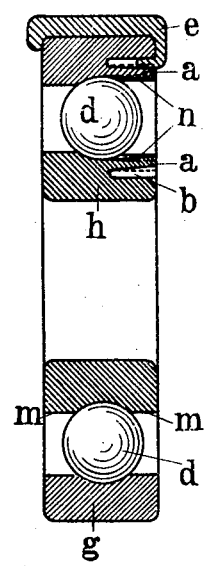
Fig. 3.
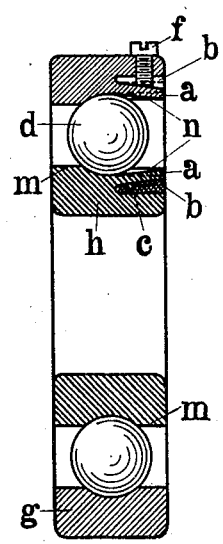
Witnesses:
Harry King.
Joseph C. Slack.
Inventor
Otto von Schütz
By Julian C. Dowell
his attys.

UNITED STATES PATENT OFFICE.

OTTO VON SCHÜTZ, OF CHARLOTTENBURG, GERMANY, ASSIGNOR TO FICHTEL & SACHS, OF SCHWEINFURT, GERMANY, A FIRM COMPOSED OF KARL FICHTEL AND ERNST SACHS.

BALL-BEARING.

968,271.  Specification of Letters Patent.  Patented Aug. 23, 1910.

Application filed August 19, 1908. Serial No. 449,338.

*To all whom it may concern:*

Be it known that I, OTTO VON SCHÜTZ, a subject of the King of Prussia, residing at No. 5 Jaegerstrasse, Charlottenburg, Germany, have invented new and useful Improvements in Ball-Bearings, of which the following is a specification.

This invention relates to ball-bearings comprising concentric race-rings having grooves or race-ways in their confronting faces for receiving one or more series of balls, provision being made for introducing the balls laterally into the ball-race established by said race-ways.

The object is to provide a filling passage which, owing to a certain resiliency of the adjacent metal, is contracted but adapted to yield or expand to allow the balls to pass through; it being understood of course that the lateral interstice between the rings is of less width than the diameter of the ball-race. The said yieldability of the passage may be produced in various ways, a preferred means being incisures in the rings near the passage, thus providing elastic lips which are displaced by the balls as the latter are forced through. This provision of elastic passages permits of the insertion of the balls without resorting to the elasticity of the whole rings of hardened steel, as hitherto employed.

In the accompanying drawing, which forms a part of this specification, the invention is illustrated in connection with a ball bearing having a single series of balls.

Figure 1 represents a side elevation of a ball bearing embodying the invention. Fig. 2 is a vertical cross section of the bearing illustrated in Fig. 1. Fig. 3 is a similar cross section of the bearing showing a modified arrangement of the passage.

Like reference letters denote like parts throughout the several figures of the drawing.

Referring to Figs. 1 and 2, $g$ is the outer race ring and $h$ is the inner race ring of the bearing the balls $d$ of which are contained and work in hollow or channeled race ways of the confronting peripheries of the said rings $g$ and $h$; shoulders $m$ on the sides of the path of the balls and embracing the latter prevent the race rings from axial displacement relatively to each other. On one side of the bearing small depressions or rounded notches $n$ are provided in the flanges or shoulders $m$ of one or both rings, which notches extend across the entire flange $m$ into the race groove and preferably have an inclined bottom, the opening formed by these notches $n$, when located opposite one another, being smaller than the diameter of the balls $d$. The said notches may be vertical or may assume any desired inclination with respect to the race ways. The required yieldingness of the passage is attained by means of incisures $b$, arc-shaped or otherwise formed, which surround or intrench the notches, thereby producing semi-detached lips $a$ overhanging and contracting the passage, but being capable to give way yieldingly, if a ball is forced through the passage under some pressure, whereafter the lips will return into the original positions owing to their proper elasticity.

In order to prevent the described yielding of the lips $a$ after the insertion of all balls, a wedge $e$ or the like of any convenient material may be forced into the incisure $b$ and bent to embrace the outer ring $g$, as illustrated in Fig. 2. This wedge has not been shown in Fig. 1, to avoid obscurity of representation of the incisure $b$. On the inner ring $h$ a like wedge may be used, however a short wedge $c$, such as shown in Fig. 3, will also serve in many cases. Instead of wedges, any other means producing the same effect can be applied, for instance, a set screw $f$ may press upon the lip $a$, as illustrated in Fig. 3 in connection with the outer ring.

In lieu of tapering or overhanging lips $a$, straight lips may be provided, which normally present the aperture of the passage the same size at all points. Therefore, the balls can easily be inserted, whereupon partial closing of the passage will be possible and obtained by causing the elastic lips to approach under pressure with the aid of the above-described wedges or other means, for the purpose of contracting the passage. Furthermore, the described yieldingness of the passage can be produced with the entire dispensation with any incisure by altering the structure of the material around the passage in such a manner that the walls of the notches yieldingly give way under the action of a ball slipped into the bearing. This result will be obtained, for example, by tempering the adjacent part of the hardened rings.

This construction is practicable with the same advantageous effect on one ring only, if the insertion of the balls is performed in the relative eccentric position of the rings in the well known manner, or in ball bearings having two rows of balls and a corresponding number of race ways, the yielding lips being made on either side of the race rings for providing a separate passage leading to the several ball races. Illustration of these modifications has been omitted, as any one skilled in the art will be able to make them, and because they have no essential reference to the subject matter of the invention relating more specially to the passage itself.

It will be seen that the main principle of the invention is the establishment of means for inserting the balls through the annular interstice between the rings by providing a filling place where the lateral shoulder of one or both rings is, by means of incisures in the metal or in some other suitable way, made so resilient or elastic as to yield to provide a passage for introducing the balls. In the case of incisions producing semi-detached lips, a broader principle is involved viz: the production of a passage which, whether it be normally contracted or of suitable size to admit the balls without yielding, can afterward be contracted or partially closed by means of the lips, as explained in the foregoing specification.

What I claim as my invention, and desire to secure by Letters Patent, is:—

1. A ball-bearing comprising concentric rings and an interposed series of balls, there being provided a race for the balls whereby the annular interstice between the rings is of less width than the diameter of a ball, and the rings being provided with a locally elastic filling place having a wall of such greater resiliency than the rings as a whole as to permit by its own yielding the introduction of the balls.

2. A ball bearing comprising concentric rings having confronting grooves constituting race-ways for an interposed series of balls, and having a locally elastic place thereby providing a lateral filling passage normally of less width than the diameter of a ball but having a wall or walls of such greater resiliency than the rings as a whole as to admit the balls by the yielding of said wall or walls without springing or straining the rings themselves.

3. A ball-bearing comprising concentric race-rings with an interposed series of balls, there being a channeled race-way for the balls and a notch providing a passage thereinto from the side of the ring, said notch having a yielding wall of such greater resiliency than the rings as a whole as to permit inserting the balls without springing the rings, such yielding being afforded by local elasticity thereat.

4. A ball-bearing comprising concentric race-rings and interposed balls, the lateral interstice between the rings being of less width than the diameter of the ball-race, and a yielding lip at the side of the ball-race to permit insertion of the balls.

5. A ball-bearing comprising concentric race-rings having race-ways in their confronting faces, balls working and confined therein, and a yielding lip at the side of a race-way, said lip being partly detached from its ring.

6. A ball-bearing comprising concentric race-rings having race-ways in their confronting faces, balls working and confined therein, and a yielding lip at the side of a race-way, the lip being arc-shaped in cross-section.

7. A ball-bearing comprising concentric race-rings having race-ways in their confronting faces, balls working and confined therein, and a yielding lip at the side of a race-way so tapered as to provide a filling passage contracted at the outer side of the bearing.

8. A ball-bearing comprising concentric race-rings having grooves in their confronting faces making race-ways for an interposed series of balls, said rings having a lateral filling passage and yielding lips encircling the same.

9. A ball-bearing comprising concentric race-rings having race-ways in their confronting faces, balls working and confined therein, there being provided a lateral filling passage into the race-ways, and a yielding lip extending along said passage.

10. A ball-bearing comprising concentric race-rings having race-ways in their confronting faces, balls working and confined therein, there being provided a lateral filling passage into the race-ways, and a yielding lip running at the side of said passage and partially closing the same.

11. A ball-bearing comprising concentric race-rings having race-ways in their confronting faces, balls working therein, and a lip at the side of a race-way overhanging the aperture between the rings.

12. A ball-bearing comprising concentric race-rings having an interposed series of balls confined therebetween and having a lateral filling passage, and a yielding lip overhanging said passage and partially closing its mouth.

13. A ball-bearing comprising concentric race-rings having race-ways in their confronting faces, and balls working therein, there being an incisure in a ring making a partly detached yielding lip.

14. A ball-bearing comprising concentric race-rings having race-ways in their confronting faces, balls working therein, a yielding lip at the side of a race-way overhanging the aperture between the rings, and means for securing the lip in the overranging position.

15. A ball-bearing comprising concentric race-rings having race-ways in their confronting faces, balls working therein, there being an incisure in a ring making a semi-detached lip overhanging the aperture between the rings, and means inserted in the incisure securing the lip in its overhanging position.

16. A ball-bearing comprising concentric race-rings having race-ways in their confronting faces, and balls working and confined therein, said rings having a lateral filling passage, there being an incisure made in a ring around said passage providing a semi-detached lip at the side of said passage.

17. A ball-bearing comprising concentric race-rings with balls confined and running therebetween, there being a lateral incisure in a ring making a resilient place adapted to yield to provide a passage for introducing the balls.

18. A ball-bearing comprising concentric race-rings having confronting grooves and balls running therein, said rings having lateral incisures making resilient places which when in opposition can yield to allow passage of the balls.

19. A ball-bearing comprising concentric race-rings and balls confined and running therebetween, said rings having a lateral filling passage normally contracted but with a wall of such greater resiliency than the rings as a whole as to yield to admit the balls without springing the rings themselves, such resiliency being afforded by local elasticity thereat.

20. A ball-bearing comprising concentric race-rings having confronting grooves and balls running therein, a ring having a lateral notch to furnish a filling passage into the ball-race provided by said grooves, there being an incisure in the metal near said notch providing a resilient lip which normally contracts the passage but will yield to admit the balls.

21. A ball-bearing comprising concentric race-rings having confronting grooves and balls running therein, said rings having lateral notches to furnish a filling passage for introducing the balls into the ball-race provided by said grooves, there being an incisure in the metal near a notch providing a lip by means of which said filling passage can be contracted.

22. A ball-bearing comprising concentric grooved rings with an interposed series of balls, there being an incisure in the metal of a ring near the annular interstice providing a yielding wall for a lateral filling passage.

In testimony whereof I have set my signature to this specification in the presence of two subscribing witnesses.

OTTO VON SCHÜTZ.

Witnesses:
  WOLDEMAR HAUPT,
  HENRY HASPER.